United States Patent
Anastas

(10) Patent No.: US 7,387,135 B2
(45) Date of Patent: Jun. 17, 2008

(54) VALVE ASSEMBLY HAVING RIGID SEATING SURFACES

(75) Inventor: Jeffrey V. Anastas, Kennebunk, ME (US)

(73) Assignee: MKS Instruments, Inc., Wilmington, MA (US)

( * ) Notice: Subject to any disclaimer, the term of this patent is extended or adjusted under 35 U.S.C. 154(b) by 95 days.

(21) Appl. No.: 11/021,912

(22) Filed: Dec. 23, 2004

(65) Prior Publication Data

US 2006/0137744 A1    Jun. 29, 2006

(51) Int. Cl.
*G05D 7/06* (2006.01)
*F16K 25/00* (2006.01)

(52) U.S. Cl. .............................. 137/487.5; 137/454.2; 137/486; 251/333; 251/359; 251/368; 251/129.15

(58) Field of Classification Search ............. 137/454.2, 137/486, 487.5; 251/333, 357, 359, 360, 251/368, 129.15
See application file for complete search history.

(56) References Cited

U.S. PATENT DOCUMENTS

| | | | | |
|---|---|---|---|---|
| 4,228,821 A | * | 10/1980 | Stark | 137/533.11 |
| 4,365,747 A | * | 12/1982 | Knapp et al. | 239/125 |
| 4,569,504 A | * | 2/1986 | Doyle | 251/129.15 |
| 4,796,854 A | | 1/1989 | Ewing | |
| 4,903,938 A | * | 2/1990 | Nishizawa et al. | 251/61.5 |
| 5,727,769 A | | 3/1998 | Suzuki | |
| 5,785,297 A | * | 7/1998 | Ha | 251/129.14 |
| 6,505,812 B1 | | 1/2003 | Anastas | |
| 6,794,117 B2 | * | 9/2004 | Andrews | 430/293 |
| 6,994,110 B2 | * | 2/2006 | Barillot et al. | 137/554 |

FOREIGN PATENT DOCUMENTS

EP        0 392 072 A1 *   10/1990

OTHER PUBLICATIONS

PCT International Preliminary Report on Patentability for related PCT Application No.: PCT/US2004/046317, 7 pages.

* cited by examiner

*Primary Examiner*—Ramesh Krishnamurthy
(74) *Attorney, Agent, or Firm*—McDermott Will & Emery LLP

(57) ABSTRACT

A valve assembly including a valve body having a bore and a port extending to the bore, an orifice member received in the bore and having an end wall and a side wall, and wherein the end wall defines an orifice providing fluid communication with the port of the body. A valve member is received in the orifice member and is movable along an axis with respect to the orifice, and a flat spring is secured to the side wall of the orifice member and has arms secured to the valve member. A valve seat is secured to the end wall and defines an opening over the orifice, and a plug is secured to an end of the valve member opposite the valve seat such that, when the valve member is moved along the axis towards the orifice, the plug contacts the seat to seal the opening.

20 Claims, 6 Drawing Sheets

VALVE ASSEMBLY HAVING RIGID SEATING SURFACES

FIELD OF THE INVENTION

The present disclosure relates to the field of fluid flow control and, more particularly, to a valve assembly. Even more particularly, the present disclosure relates to a valve assembly having rigid seating surfaces.

BACKGROUND OF THE DISCLOSURE

Fluid valves exist in a wide variety of forms and sizes, serving a multitude of purposes, handling flowable materials whose characters range from light gaseous to heavy slurries and near-solids, and operable at various speeds under controls as diverse as simple binary (ON-OFF), proportional, direct-manual and remote-electrical. Those which are capable of responding quickly to govern even relatively large flows with precision, and with expenditure of little electrical power, are of special interest in certain industrial processing, such as the automatic regulation of gases in semiconductor and integrated-circuit manufacturing. Mass flow controllers, for example, are widely used in semiconductor and integrated-circuit manufacturing to control the delivery of process gases, and the mass flow controllers include such valves.

U.S. Pat. Nos. 4,796,854, 5,727,769, and 6,505,812, which are all assigned to the assignee of the present disclosure, show examples of solenoid proportioning valve assemblies. The disclosed valve assemblies all include movable valve members positioned by an armature to open and close a valve orifice.

The valve assemblies may use metals seals or elastomeric seals. The use of metal sealing, or seating, surfaces eliminates permeation from the atmosphere and the outgassing and particle generation inherent to elastomeric seals. Other materials, such as glass, sapphire, or ceramic, may be used as the seating surfaces to avoid chemical degradation from the particular fluid being controlled by the valve assembly, and/or degradation due to temperatures and pressures, for example.

It is often preferable to use sapphire in place of metal in the seating surfaces of valve assemblies. In high accuracy valve assemblies used for the precise delivery of gases, metal seating surfaces may require a hand-lapping final operation to customize orifice surfaces to provide suitable sealing. Such lapping operations however, are labor intensive and increase the manufacturing costs of the valve assemblies. In addition, metal-lapped surfaces can be attacked at high temperatures by corrosive fluids, which degrades sealing over time. Sapphire, which is a very hard material that can be made flat and smooth, is less susceptible to such degradation.

Other valves may incorporate a ceramic ball that seats in a conical stainless steel orifice. Such an arrangement, however, may not provide smooth control between 2% and 100% of full scale flow.

What is still desired is a new and improved valve assembly. The valve assembly will preferably provide improved cut-off sealing, eliminate the need for hand-crafted metal parts and allow the use of impervious non-metal material for seating surfaces, and provide stable long term control valve shut-off capability. The new and improved valve assembly will also preferably provide smooth control between 2% and 100% of full scale flow, over multiple full scale ranges.

SUMMARY OF THE DISCLOSURE

The present disclosure, accordingly, provides a valve assembly including a valve body having a bore and a port extending to an end of the bore to provide fluid communication with the bore. An orifice member is received in the bore and includes an end wall received on the end of the bore and a side wall extending from the end wall. The end wall of the orifice member defines an orifice providing fluid communication with the port of the valve body. A valve member is received in the orifice member and is movable along an axis with respect to the orifice.

The valve assembly also includes a flat spring secured on an end of the side wall of the orifice member and having arms extending radially inwardly and secured to the valve member. The flat spring acts to bias the valve member with respect to the orifice. A valve seat is secured to the end wall of the orifice member and defines an opening providing fluid communication with the orifice, and a plug is secured to an end of the valve member opposite the valve seat such that, when the valve member is moved along the axis towards the orifice, the plug contacts the valve seat to seal the opening of the valve seat and prevent fluid flow through the orifice and the port of the body.

According to one aspect of the present disclosure, the valve seat and the plug are both made of a rigid, impervious, non-metal material comprising sapphire, and have planar seating surfaces that extend perpendicular to the axis of the valve member. Among other features and advantages, the novel design of the valve assembly of the present disclosure allows the planar seating surfaces to be made parallel during manufacturing, so that the sapphire plug and valve seat can provide improved cut-off sealing.

In addition, the use of sapphire seating surfaces also eliminates the need for hand-crafted metal parts, and provides stable long term control valve shut-off capability. Moreover, the use of planar seating surfaces provides smooth control between 2% and 100% of full scale flow, over multiple full scale ranges.

These and other features and benefits of the present disclosure will become more apparent upon reading the following detailed description in combination with the accompanying drawings.

BRIEF DESCRIPTION OF THE DRAWINGS

The foregoing and other features and advantages of this disclosure will be better understood from the detailed description and the drawings, in which.

Like reference characters designate identical or corresponding components and units throughout the several views.

DETAILED DESCRIPTION OF EXEMPLARY EMBODIMENTS

Figure 4A:
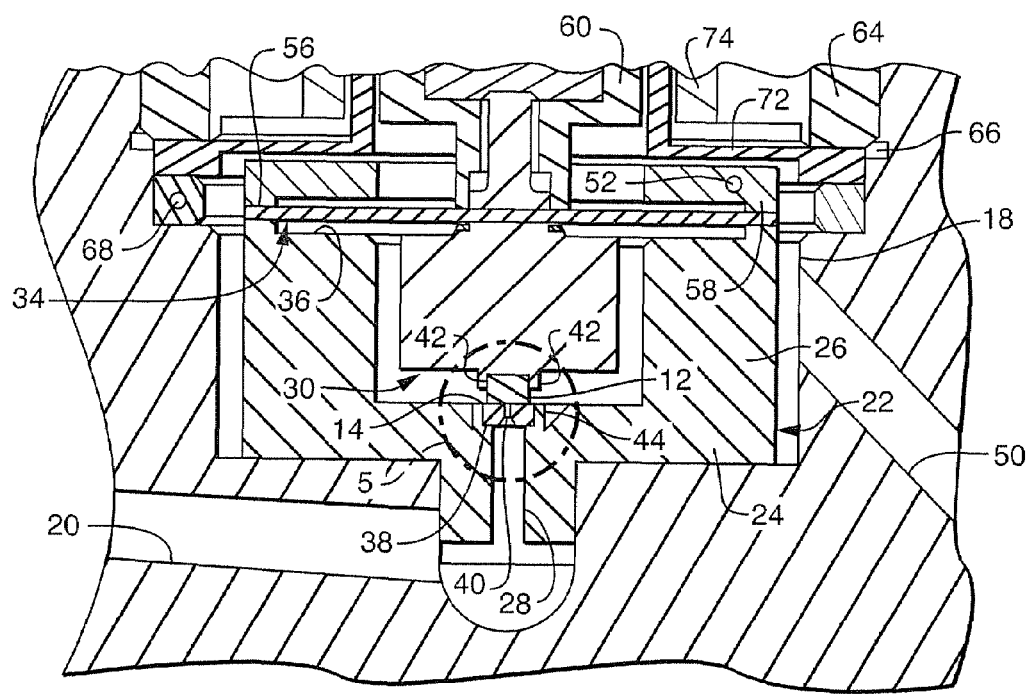
FIG. 4A is an enlarged sectional view of the valve assembly of FIG. 1, as contained in the circled portion "b 4" of FIG. 3.
Figure 4B:
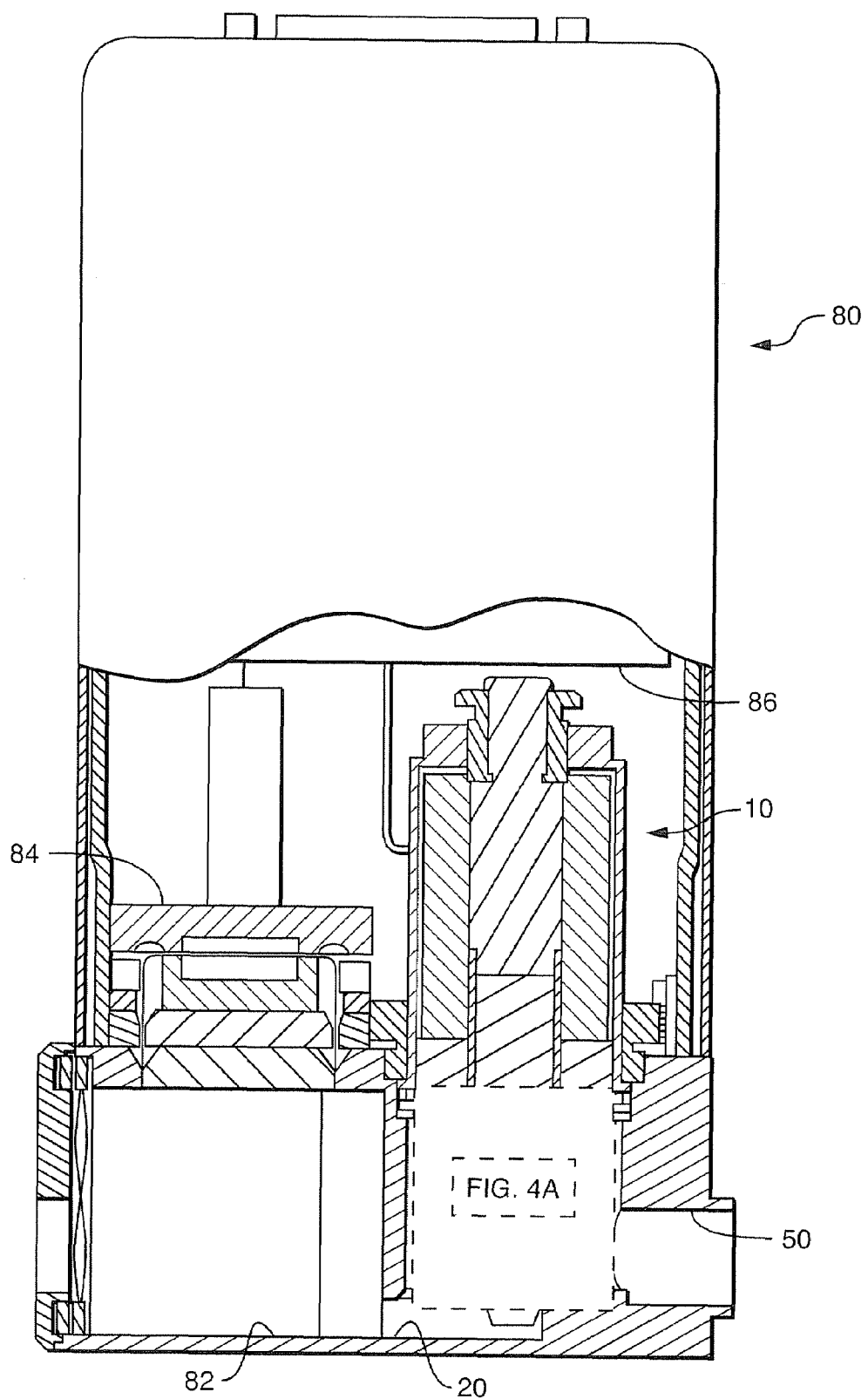
FIG. 4B is side sectional view of an exemplary mass flow controller configured with the valve assembly of FIG. 4A.
Figure 5:
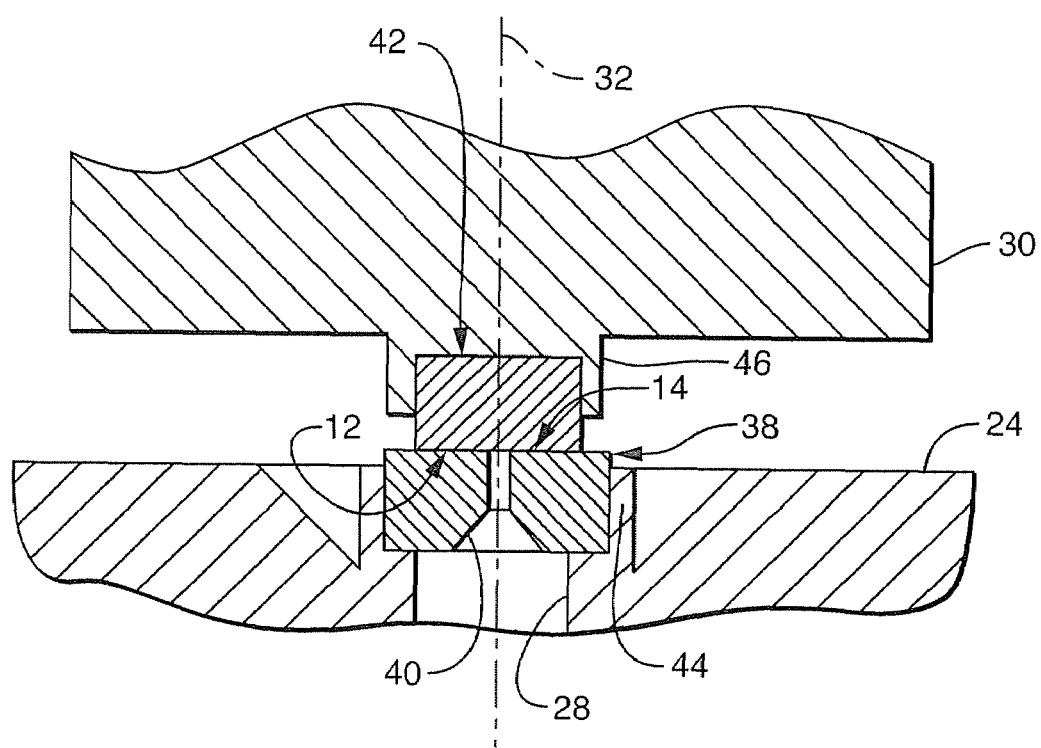
FIG. 5 is an enlarged sectional view of the valve assembly of FIG. 1, as contained in the circled portion "5" of FIG. 4A.

Referring to FIGS. 1 through 5, the present disclosure generally provides a valve assembly 10 that includes sapphire seating surfaces 12, 14, shown best in FIG. 5. The novel design of the valve assembly 10 of the present disclosure allows the seating surfaces 12, 14, which are planar, to be made parallel during manufacturing, so that the seating surfaces 12, 14 provide improved cut-off sealing. In addition, the use of sapphire seating surfaces 12, 14 also eliminates the need for hand-crafted metal parts, and provides stable long term control valve shut-off capability (i.e., no degradation of the seating surfaces 12, 14). Moreover, the use of planar seating surfaces 12, 14 provides smooth valve control between 2% and 100% of full scale flow, over multiple full scale ranges.

Referring to FIGS. 1 through 5, the valve assembly 10 includes a valve body 16 having a bore 18 and a port 20 extending to an end of the bore 18. An orifice member 22 is received in the bore 18 of the body 16 and includes an end wall 24 received on the end of the bore 18 and a side wall 26 extending from the end wall 24. The end wall 24 of the orifice member 22 defines an orifice 28 providing fluid communication with the port 20 of the body 16.

The valve assembly 10 also includes a valve member 30 received in the orifice member 22 and that is movable along an axis 32 with respect to the orifice 28. A flat spring 34 is secured on an end 36 of the side wall 26 of the orifice member 22 and includes arms extending radially inwardly and secured to the valve member 30. The flat spring 34 acts to bias the valve member 30 with respect to the orifice 28, such that the valve member 30 is normally in a closed or an opened position.

The valve assembly 10 further includes a valve seat 38 secured to the end wall 24 of the orifice member 22 and defining an opening 40 providing fluid communication with the orifice 28, and a plug 42 secured to an end of the valve member 30 opposite the valve seat 38 such that, when the valve member 30 is moved along the axis 32 towards the orifice, the plug 42 contacts the valve seat 38 to seal the opening 40 of the valve seat 38 and prevent fluid flow through the orifice 28 and the port 20 of the body 16.

The valve seat 38 and the plug 42 are made of a rigid, impervious non-metal material comprised of sapphire. The valve seat 38 and the plug 42 define the planar seating surfaces 12, 14 that extend perpendicular to the axis 32 of the valve member 30. The seating surfaces 12, 14 are polished smooth.

The end wall 24 of the orifice member 22 includes a setting 44 and the valve seat 38 is press-fit into the setting 44 of the end wall 24. The end of the valve member 30 includes a setting 46 and the plug 42 is press fit into setting 46 of the valve member 30. According to one exemplary embodiment, the orifice member 22 and the valve member 30 are made of stainless steel.

In the exemplary embodiment shown, the port 20 in the body 16 comprises an inlet port and the flat spring 34 biases the valve member 30 towards the inlet port 20 to normally cause the plug 42 to seal the opening 40 of the valve seat 38. The body 16 also includes an outlet port 50, as shown.

In the exemplary embodiment shown, the orifice member 22 is cup-shaped and the side wall 26 of the orifice member 22 is continuous. The flat spring 34 is secured to the orifice member 22 with a clamping ring 52 which, in turn, is secured to the orifice member 22 with screws 54. The end 36 of the side wall 26 of the orifice member 22 includes a continuous ridge 56 receiving the flat spring 34 and the clamping ring 52 includes a continuous ridge 58 securing the flat spring 34 against the continuous ridge 56 of the side wall 26.

In the exemplary embodiment shown in the drawings, an electrical solenoid assembly is used to move the valve member 30 to control fluid flow between the inlet and the outlet ports 20, 50. The solenoid assembly includes an armature 60 of magnetic material fixed to the valve member 30, and an electrical solenoid winding 62 received coaxially over the armature 60 for moving the armature 60 and the valve member 30 along the axis 32 upon the application of an electrical current to the winding 62, so that the valve member 30 opens and closes the opening 40 of the valve seat 38 and controls fluid flow between the inlet and the outlet ports.

In one exemplary embodiment, the valve assembly 10 is configured so that when electrical control currents are applied to the solenoid winding 62 by a suitable source, such as an output amplifier stage of a controller of a flow meter sensing an actual flow rate that is to be regulated by the valve, the armature 60 is moved away from the valve seat 38 to open the opening 40 of the valve seat 38, and increase flow between the inlet and outlet ports 20, 50. The valve assembly 10 is further configured so that, when the solenoid winding 62 is not energized, the spring 34 moves the valve member 30 to its starting position, wherein the valve member 30 is biased against the valve seat 38 to close the opening 40 therethrough.

The valve assembly 10 further includes a housing 64 received over the solenoid winding 62 and having an annular flange 66 for securing the housing 64 to the valve body 16. An annular seal 68 is positioned between the flange 66 of the housing 64 and the valve body 16. A solenoid core 70 is positioned in the solenoid winding 62 above the armature 60, all of which are of appropriate magnetic material. A non-magnetic sleeve 72 is secured to the lower end of the solenoid core 70, and has a sufficiently large central axial opening to just freely accommodate movements of the armature 60 along the axis 32. An annular non-magnetic spacer 74 is positioned under the solenoid winding 62.

Figure 1:
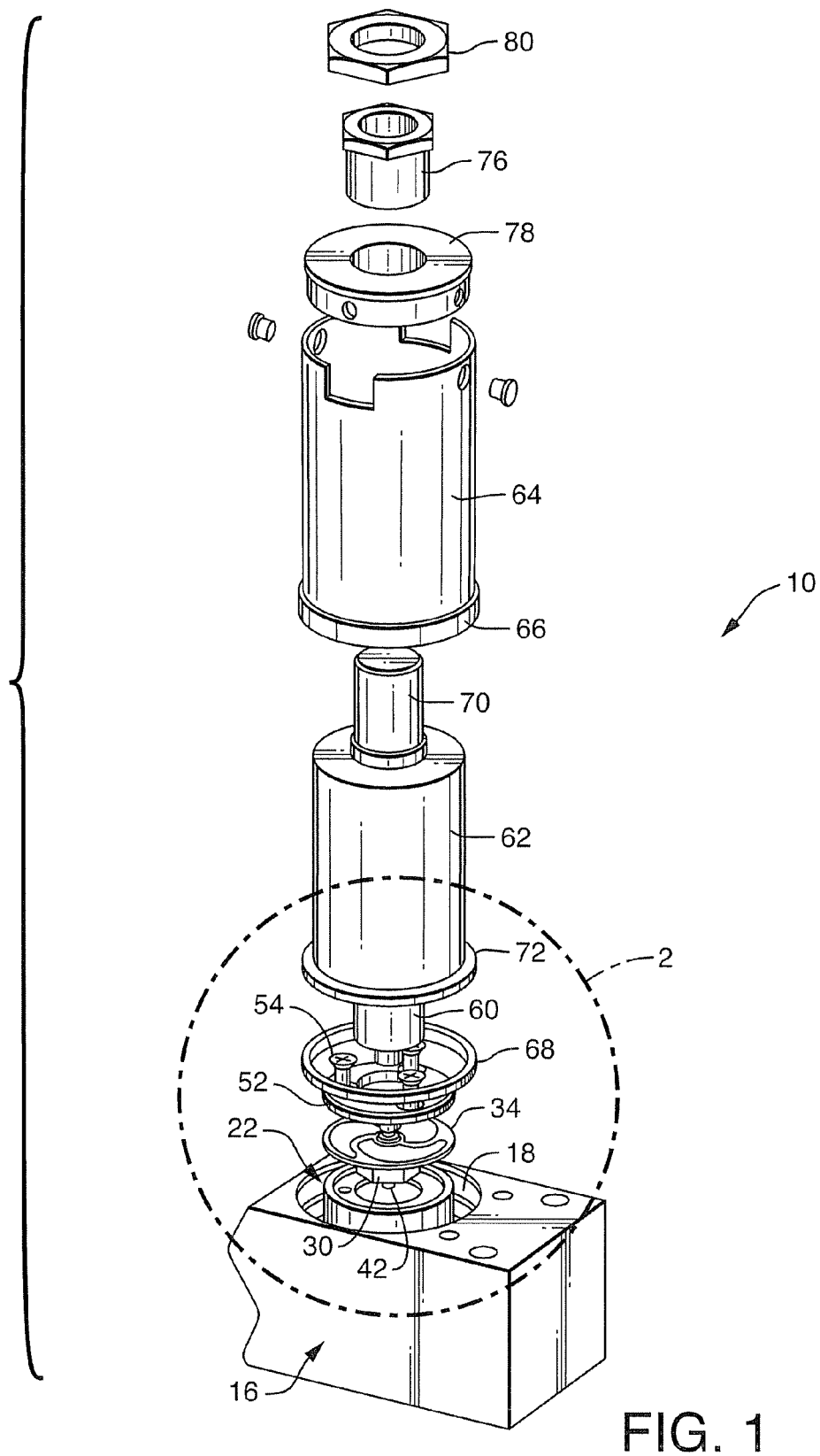
FIG. 1 is a exploded perspective view of an exemplary embodiment of a valve assembly constructed in accordance with the present disclosure.
Figure 2:
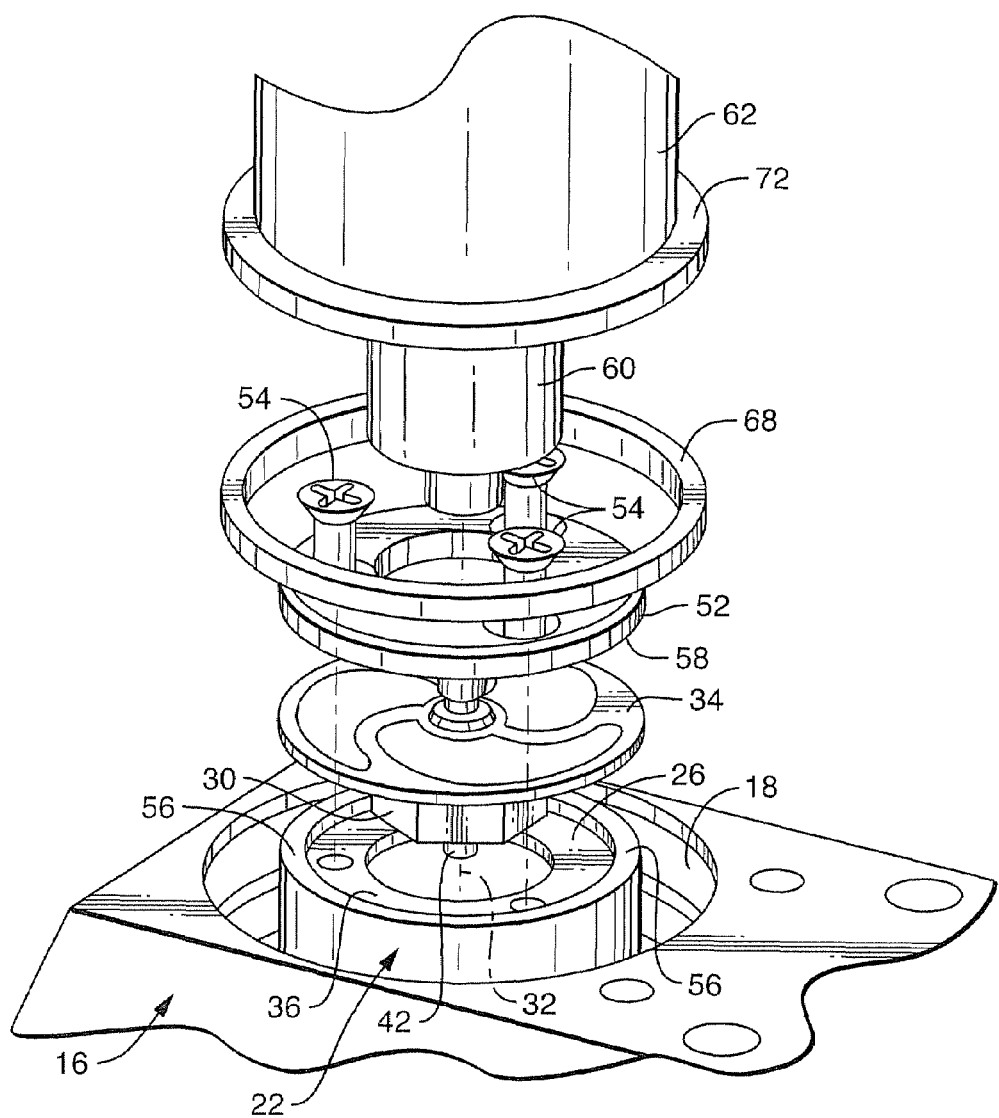
FIG. 2 is an enlarged exploded perspective view of the valve assembly of FIG. 1, as contained in the circled portion "2" of FIG. 1.
Figure 3:
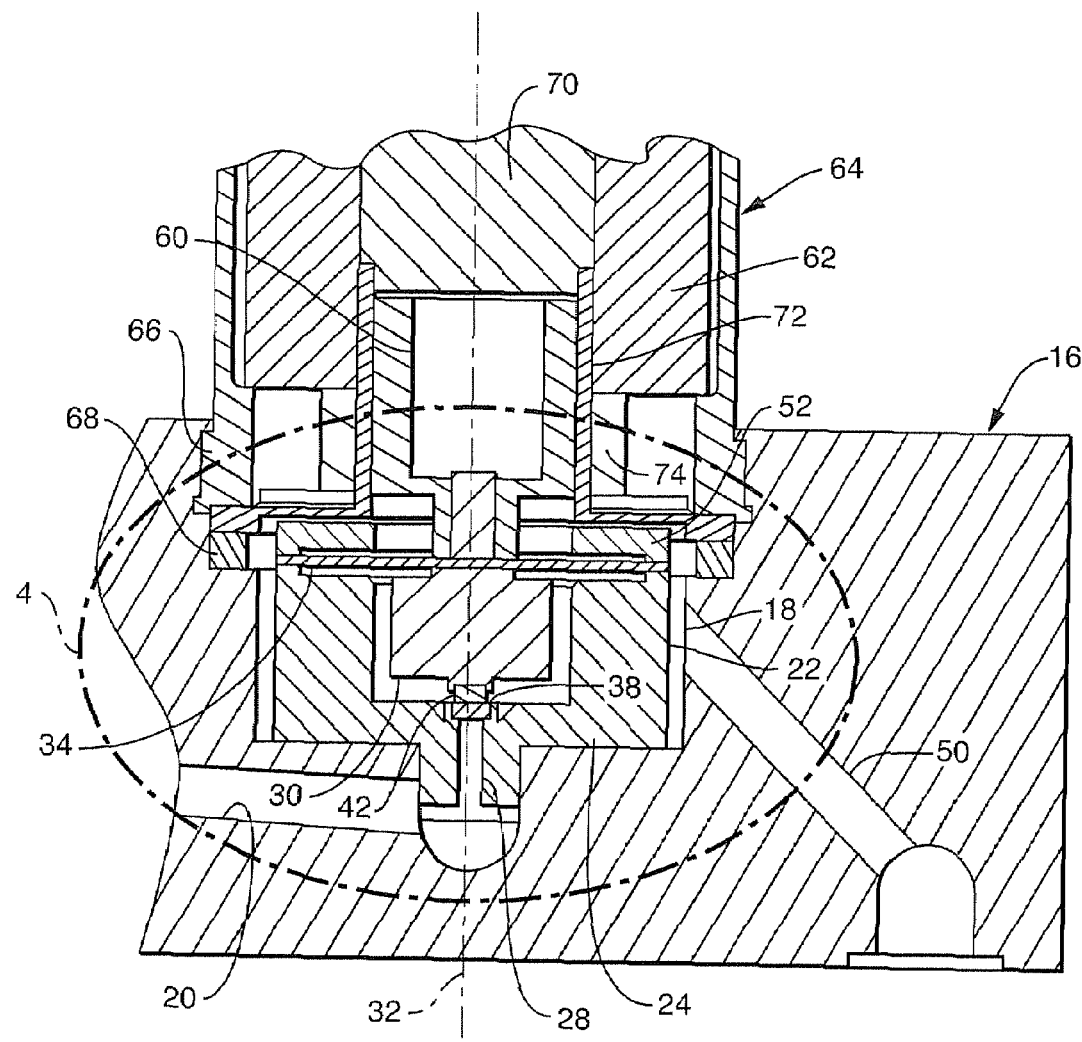
FIG. 3 is a sectional view of a portion of the valve assembly of FIG. 1.

As shown in FIG. 1, an annular fastener 76 adjustably secures the solenoid core 70 through an end wall 78 of the housing 64, whereby turning the fastener 76 adjusts the position of the core 70 along the axis 32, such that the starting position of the valve member 30 with respect to the valve seat 38 can also be adjusted by turning the fastener 76. A threaded nut 78 is used to adjustable lock the fastener against the end wall.

Essentially, only the small centering forces of the flat spring 34 needs to be overcome when the solenoid winding 62 is energized. It should be understood that only a very small axial motion of the valve member 30 is required to achieve full flow through the opening 40.

As an example of an exemplary application, a valve assembly 10 constructed in accordance with the present disclosure can be incorporated into a mass flow controller (MFC) 80 as depicted in FIG. 4B. Such an MFC 80 can be configured and arranged for controlling the flow rate of a gas from a source and can be used, for example, in semiconductor manufacturing applications to precisely deliver a process vapor (or one or more gases) to a process chamber for making a semiconductor wafer. The MFC 80 may be temperature-based MFC or pressure-based, as well as other types of flow control devices. A suitable MFC is shown, for example, in U.S. Pat. No. 6,505,812, which is assigned to the assignee of the present disclosure and incorporated herein by reference.

With continued reference to FIG. 4B, MFC 80 can include a flow path 82 connected to the inlet port 20 of the valve assembly 10, a flow sensor assembly 84 for sensing flow through the flow path 82, and a control device 86 programmed to receive a predetermined desired flow rate value from a user, receive an indication of flow from the flow sensor assembly 84, and determine an actual flow rate through the flow path 82. The control device 86 can also programmed to provide an increasing electrical charge to the winding 62 (e.g.. of FIG. 4A) in order to increase flow if the actual flow rate is less than the desired flow rate, and to remove the electrical charge to decrease flow if the actual flow rate is greater than the desired flow rate. By "control device" it is meant herein a device or mechanism used to regulate or guide the operation of the MFC. The control device 86 preferably includes a computer or central processing unit (CPU) including at least a processor, memory and clock mounted. The control device 86 can be configured to operate in a feedback loop to maintain the desired flow at all times. Information on flow rate as a function of the control current of the solenoid winding 62 (e.g., of FIG. 4A) is preferably stored in the control device 86 in order to quicken the response time of the MFC.

The embodiment and practices described in this specification have been presented by way of illustration rather than limitation, and various modifications, combinations and substitutions may be effected by those skilled in the art without departure either in spirit or scope from this disclosure in its broader aspects and as set forth in the appended claims.

The invention claimed is:

1. A valve assembly comprising:
    a valve body including a bore and a port extending to an end of the bore;
    an orifice member received in the bore of the body and including an end wall received on the end of the bore and a side wall extending from the end wall, and wherein the end wall defines an orifice providing fluid communication with the port of the body;
    a valve member received in the orifice member that is movable along an axis with respect to the orifice;
    an armature of magnetic material fixed to the valve member and configured and arranged for movement within a solenoid winding;
    a flat spring secured on an end of the side wall of the orifice member and including arms extending radially inwardly and secured to the valve member, whereby the flat spring acts to bias the valve member with respect to the orifice;
    a valve seat having a planar seating surface and secured to the end wall of the orifice member and defining an opening providing fluid communication with the orifice; and
    a plug having a planar seating surface and secured to an end of the valve member opposite the valve seat wherein for motion of the valve member along the axis towards the orifice, the plug and valve seat are configured and arranged to contact one another by respective planar seating surfaces to seal the opening of the valve seat and prevent fluid flow through the orifice and the port of the body.

2. A valve assembly according to claim 1, wherein the valve seat and the plug are made of a rigid, impervious non-metal material.

3. A valve assembly according to claim 1, wherein the valve seat and the plug comprise sapphire.

4. A valve assembly according to claim 1, wherein the valve seat is press-fit into the end wall of the orifice member, and the plug is press fit into the end of the valve member.

5. A valve assembly according to claim 1, wherein the end wall of the orifice member includes a setting and the valve assembly comprises a press-fit connection between the valve seat and the setting of the end wall, and the end of the valve member includes a setting and the valve assembly comprises a press-fit connection between the plug and the setting of the valve member.

6. A valve assembly according to claim 1, wherein the planar seating surfaces that extend perpendicular to the axis of the valve member.

7. A valve assembly according to claim 6, wherein the seating surfaces are polished.

8. A valve assembly according to claim 1, wherein the orifice member and the valve member are made of stainless steel.

9. A valve assembly according to claim 1, wherein the flat spring is secured to the orifice member with screws.

10. A valve assembly according to claim 1, wherein the port in the body comprises an inlet port and the flat spring biases the valve member towards the inlet port to normally cause the plug to seal the opening of the valve seat.

11. A valve assembly according to claim 1, further comprising:
    an electrical solenoid winding coaxially surrounding the armature and extending along the axis, wherein energizing the winding causes the valve member to be moved along the axis by the armature.

12. A valve assembly according to claim 11, further comprising:
    a housing received over the solenoid winding and having a flange secured to the valve body;
    a seal positioned between the flange of the housing and the valve body.

13. A valve assembly according to claim 12, wherein the flange of the housing is secured to the valve body with screw threads.

14. A valve assembly according to claim 12, further comprising a solenoid core adjustably positioned along the axis within the winding between an end wall of the housing and the armature.

15. A valve assembly according to claim 14, further comprising a sleeve coaxially positioned with respect to the armature between the armature and the solenoid winding, the sleeve secured to and movable with the solenoid core.

16. A flow controller including a valve assembly according to claim 1, and further comprising:
    a flow path connected to the port of the valve assembly;
    a flow sensor assembly for sensing flow through the flow path; and
    a control device programmed to,
        receive a desired flow rate from a user input device,
        receive an indication of flow from the flow sensor assembly,
        determine an actual flow rate through the flow path,
        cause the valve member of the valve assembly to move away from the valve seat to increase flow through the port if the actual flow rate is less than the desired flow rate, and
        cause the valve member of the valve assembly to move towards the valve seat to decrease flow through the port if the actual flow rate is greater than the desired flow rate.

17. A valve assembly according to claim 1, wherein the flat spring is secured to the orifice member with a clamping ring.

18. A valve assembly according to claim 17, wherein the clamping ring is secured to the orifice member with screws.

19. A valve assembly according to claim 18, wherein the orifice member is cup-shaped and the side wall of the orifice member is continuous.

20. A valve assembly according to claim 19, wherein the end of the side wall of the orifice member includes a continuous ridge receiving the flat spring and the clamping ring includes a continuous ridge securing the flat spring against the continuous ridge of the side wall.

* * * * *